United States Patent
Kato et al.

(10) Patent No.: US 7,414,825 B2
(45) Date of Patent: Aug. 19, 2008

(54) ELECTROCHEMICAL DEVICE

(75) Inventors: Kikuko Kato, Hirakata (JP); Yasuo Nakahara, Hirakata (JP); Mamoru Kimoto, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 235 days.

(21) Appl. No.: 11/474,953

(22) Filed: Jun. 27, 2006

(65) Prior Publication Data

US 2006/0291141 A1     Dec. 28, 2006

(30) Foreign Application Priority Data

Jun. 27, 2005    (JP) ............... 2005-186929

(51) Int. Cl.
*H01G 9/00* (2006.01)

(52) U.S. Cl. ...................... 361/502; 361/503

(58) Field of Classification Search .......... 361/502–503
See application file for complete search history.

(56) References Cited

U.S. PATENT DOCUMENTS

| | | | |
|---|---|---|---|
| 5,900,336 A | 5/1999 | Kabata et al. | |
| 6,912,116 B2 * | 6/2005 | Takahashi et al. | 361/502 |
| 2002/0080558 A1 * | 6/2002 | Nonaka et al. | 361/502 |
| 2003/0147201 A1 * | 8/2003 | Nakazawa et al. | 361/502 |
| 2004/0017647 A1 * | 1/2004 | Okamoto et al. | 361/502 |
| 2004/0170898 A1 | 9/2004 | Shibuya et al. | |
| 2005/0170242 A1 * | 8/2005 | Sato et al. | 429/128 |
| 2007/0076349 A1 * | 4/2007 | Dementiev et al. | 361/502 |
| 2007/0109722 A1 * | 5/2007 | Ohmori | 361/502 |

FOREIGN PATENT DOCUMENTS

| | | |
|---|---|---|
| JP | 05055085 A * | 3/1993 |
| JP | 05-343263 | 12/1993 |
| JP | 2002-231588 | 8/2002 |
| JP | 2003-077542 | 3/2003 |
| JP | 2003-323895 | 11/2003 |
| JP | 2004-047487 | 2/2004 |
| JP | 2004-087824 | 3/2004 |

* cited by examiner

*Primary Examiner*—Eric Thomas
(74) *Attorney, Agent, or Firm*—NDQ&M Watchstone LLP; S. Peter Konzel

(57) ABSTRACT

An electrochemical device includes a pair of electrodes at least containing activated carbon powder, a separator interposed between the pair of electrodes, and an electrolytic solution impregnated into the pair of electrodes and the separator. The electrodes and the separator are stacked on a collector. Each of the electrodes includes at least two layers arranged in a thickness direction, and the two layers are made of the activated carbon powder having mutually different average grain sizes. The average grain size of the activated carbon powder in the layer contacting the separator is greater than the average grain size of the activated carbon powder in the layer located on the collector side.

2 Claims, 2 Drawing Sheets

ELECTROCHEMICAL DEVICE

CROSS REFERENCE TO RELATED APPLICATIONS

This application is based upon and claims the benefit of priority from prior Japanese Patent Application No. 2005-186929, filed on Jun. 27; the entire contents of which are incorporated herein by reference.

BACKGROUND OF THE INVENTION

1. Field of the Invention

The present invention relates to an electrochemical device including a pair of electrodes at least containing activated carbon powder, a separator interposed between the pair of electrodes, and an electrolytic solution impregnated into the pair of electrodes and the separator, the electrodes and the separator are stacked on a collector.

2. Description of the Related Art

An electric double layer capacitor has been conventionally used in a back-up power supply, an auxiliary power supply and the like, for a cellular telephone and a home appliance as a small-size high-capacity capacitor. A higher performance of such a capacitor has been expected.

A layer of electrodes made of activated carbon powder having uniform average grain sizes are used in this electric double layer capacitor (see FIG. 1). Moreover, to enhance a discharge capacity of the electric double layer capacitor, there is an attempt to increase a bulk density of the activated carbon powder included in the electrodes.

However, when increasing the bulk density of the electrodes, impregnation of an electrolytic solution into the electrodes is deteriorated. Also, incorporation of bubble and impregnation of the electrolytic solution into the electrodes are insufficient. Accordingly, there is a problem that the internal resistance increases after assembly.

To solve this problem, disclosed is a technique for impregnating the electrolytic solution into the electrodes for a long time, and for impregnating the electrolytic solution by evacuating it when infusing the electrolytic solution (see Japanese Unexamined Patent Publication No. Hei 5(1993)-343263, for example).

SUMMARY OF THE INVENTION

The inventors of the present invention have focused on an aspect that an impregnation property of an electrolytic solution is improved, when spaces where the electrolytic solution contacts are increased by enlarging grain sizes of activated carbon powder contained in electrodes. In this way, the inventors have accomplished the present invention.

A first aspect of the present invention is an electrochemical device including a pair of electrodes at least containing activated carbon powder, a separator interposed between the pair of electrodes, and an electrolytic solution impregnated into the pair of electrodes and the separator. The electrodes and the separator are stacked on a collector. Each of the electrodes includes at least two layers arranged in a thickness direction, and the two layers are made of the activated carbon powder having mutually different average grain sizes. The average grain size of the layer contacting the separator is greater than the average grain size of the layer located on the collector side.

According to the electrochemical device of the first aspect, each of the electrodes includes at least two layers arranged in the thickness direction, and the two layers are made of the activated carbon powder having mutually different average grain sizes. Moreover, the average grain size of the activated carbon powder in the layer contacting the separator is set greater than the average grain size of the activated carbon powder in the layer located on the collector side. Thereby, the layer of the electrode located on the separator side, i.e., a surface of the electrode where the electrolytic solution is dropped mainly and impregnation of the electrolytic solution is performed mainly, has the activated carbon powder with a larger average grain size. Therefore, an impregnation property of the electrolytic solution is improved, and it is possible to suppress the raise of the internal resistance after assembly.

On the other hand, since the layer located on the collector side has the activated carbon powder with the smaller average grain size, a bulk density of the activated carbon powder can be increased favorably in the entire electrodes, and a high discharge capacity can be maintained.

Moreover, according to the electrochemical device of the first aspect, the electrolytic solution is easily impregnated, even if a time period for impregnation is reduced during assembly, and if the electrochemical device is assembled without performing a process such as vacuum impregnation. Therefore, operations at the time of assembly can be simplified, and the raise of the internal resistance after assembly can be suppressed without dispersion.

A second aspect of the present invention is an electrochemical device including a pair of electrodes at least containing activated carbon powder, a separator interposed between the pair of electrodes, and an electrolytic solution impregnated into the pair of electrodes. The separator and the electrodes are stacked on a collector. Each of the electrodes include at least two layers arranged in a width direction, and the two layers made of the activated carbon powder having mutually different average grain sizes. Here, the "width direction" is defined as a direction substantially parallel to a boundary surface between the electrode and the separator.

According to the electrochemical device of the second aspect, each of the electrodes include at least two layers arranged in the width direction, and the two layers are made of the activated carbon powder having mutually different average grain sizes. It is possible to provide portions including the activated carbon powder with a larger average grain size on a layer of the electrode located on the separator side, i.e., a surface of the electrode where the electrolytic solution is dropped mainly and impregnation of the electrolytic solution is performed mainly. Therefore, an impregnation property of the electrolytic solution is improved, and it is possible to suppress the raise of the internal resistance after assembly.

Meanwhile, according to the electrochemical device of the second aspect, since the electrodes have portions including the activated carbon powder with a smaller average grain size, a bulk density of the activated carbon powder can be increased favorably in the entire electrodes, and a high discharge capacity can be maintained.

Moreover, according to the electrochemical device of the second aspect, the electrolytic solution is easily impregnated, even if a time period for impregnation is reduced during assembly, and if electrochemical device is assembled without performing a process such as vacuum impregnation. Therefore, operations at the time of assembly can be simplified, and the raise of the internal resistance after assembly can be suppressed without dispersion.

DETAILED DESCRIPTION OF THE EMBODIMENTS

Figure 1:
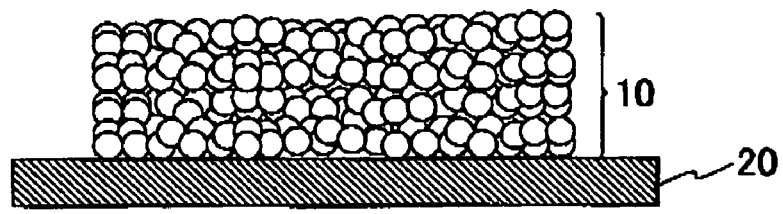
FIG. 1 is an enlarged view of a polarizable electrode in a conventional electric double layer capacitor.

Next, an embodiment of the present invention will be described with reference to the accompanying drawings. In the following description of the drawings, the same or similar constituents are designated by the same or similar reference numerals. It should be noted, however, that the drawings are schematic and proportions of respective dimensions and the like are different from actual configurations. Accordingly, specific dimensions and the like should be determined in consideration of the following description. Moreover, it is needless to say that the drawings contain parts where relations and proportions of the dimensions are different from one another.

(Electrochemical Device)

In an embodiment of the present invention, an electric double layer capacitor of a coin type will be described as an example of an electrochemical device.

Figure 2:
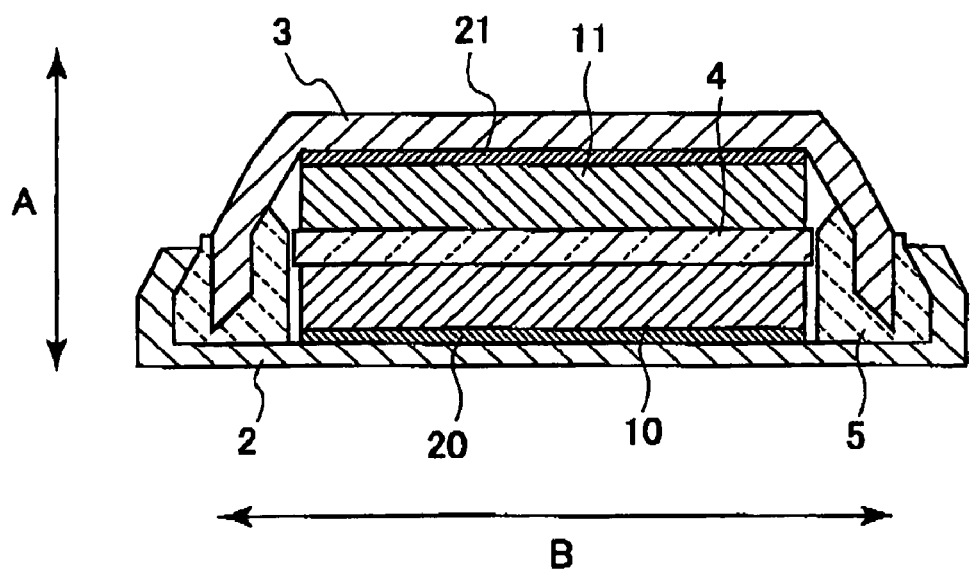
FIG. 2 is a cross-sectional view of an electric double layer capacitor according to an embodiment of the present invention.

As shown in FIG. 2, the electric double layer capacitor includes a pair of polarizable electrodes 10 and 11, a separator 4 interposed between the pair of polarizable electrodes 10 and 11, and an electrolytic solution to be impregnated into each of the pair of polarizable electrodes 10 and 11 and the separator 4. The polarizable electrodes 10 and 11, and the separator 4 are stacked on a positive electrode case 2 and on a negative electrode cap 3. The positive electrode case 2 and the negative electrode cap 3 function as collectors.

The polarizable electrodes 10 and 11 are fabricated by punching out an activated carbon sheet by use of a discoidal punching die. Here, the material of the polarizable electrodes may be an electrochemically inactive material having a high specific surface. However, it is preferable that the material contains activated carbon powder which has a large specific surface. Although it is usual to form the electric double layer capacitor as shown in FIG. 2 by using these polarizable electrodes mainly containing the above-mentioned polarizable electrode material for both of the positive and negative electrodes, it is also possible to form only one of the positive and negative electrodes as the polarizable electrode while forming the other electrode as a non-polarizable electrode mainly containing a chargeable and dischargeable non-polarizable electrode material i.e. an active material for a secondary battery.

Conductive adhesive layers 20 and 21 for electrically connecting the polarizable electrodes 10 and 11 to the collectors may be a material having an excellent conductive property and electrochemical durability. A substance such as polyvinylidene fluoride, polyimide resin, styrene-butadiene resin and polyolefin resin, which contains a conductive material such as gold, platinum or carbon, can be preferably used.

An insulative membrane or cloth having a high degree of ionic permeation and given mechanical strength is used as the separator 4. Although glass fiber is the most stable for use in the case of reflow soldering, it is also possible to use resin having the heat deformation temperature equal to or above 230° C., such as polyphenylene sulfide, polyethylene terephthalate, polyamide and polyimide. A pore diameter and a thickness of the separator 4 are not particularly limited. These factors are a matter of design to be determined on the bases of a current value of a used appliance and of internal resistance of the capacitor. It is also possible to use porous materials such as ceramics.

The electrolytic solution is an organic electrolytic solution. Here, a solvent used in the electrolytic solution may be capable of dissolving electrolytes, and any publicly-known materials used for electrolytic solutions so in electric double layer capacitors and nonaqueous electrolyte secondary batteries are applicable. Such applicable solvents include, for instance, ethylene carbonate, propylene carbonate, butylene carbonate, γ-butyrolactone, γ-valerolactone, sulfolane, ethylene glycol polyethylene glycol, vinylene carbonate, chloroethylene carbonate, dimethyl carbonate, diethyl carbonate, methylethyl carbonate, dipropyl carbonate, dibutyl carbonate, dimethoxymethane, dimethoxyethane, methoxyethoxyethane, diethoxyethane, tetrahydrfuran, 2-methyl-tetrahydrofuran, dimethylformamide, dimethylsulfoxide, acetonitrile, methylformate, dioxyolane, 4-methyl-1,3-dioxolane, and the like.

In addition, alkali metal salts such as sodium salts or potassium salts, ammonium salts, and the like can be used as electrolytes in the above-mentioned electrolytic solutions.

Here, the applicable above-mentioned ammonium salts, for instance, include $NH_4ClO_4$, $NH_4BF_4$, $NH_4PF_6$, $NH_4CF_3SO_3$, $(NH_4)_2B_{10}Cl_{10}$, $(NH_4)_2B_{12}Cl_{12}$, $NH_4N(CF_3SO_2)_2$, $NH_1N(C_2F_3SO_2)_2$, $NH_4N(C_4F_9SO_2)(CF_3SO_2)$, $NH_4C(CF_3SO_2)_3$, and the like.

Other applicable electrolytes, for instance, include $(C_2H_5)_4NClO_4$, $(C_2H_5)_4NBF_4$, $(C_2H_5)_4NPF_6$, $(C_2H_5)_4NCF_3SO_3$, $[(C_2H_5)_1N]_2B_{10}Cl_{10}$, $[(C_2H_5)_4N]_2B_{12}Cl_{12}$, $(C_2H_5)_4N(CF_3SO_2)_2$, $(C_2H_5)_1N(C_2F_5SO_2)_2$, $(C_2H_5)_4N(C_4F_9SO_2)(CF_3SO_2)$, $(C_2H_5)_4C(CF_3SO_2)_3$, and the like.

Here, the pair of polarizable electrodes 10 and 11 are housed in the metallic positive electrode case 2 of a dish shape, and an opening of this positive electrode case 2 is hermetically sealed with the metallic negative electrode cap 3 with a gasket 5.

(Electrodes)

Next, the polarizable electrodes 10 and 11 shown in FIG. 2 will be described in detail.

Figure 3:
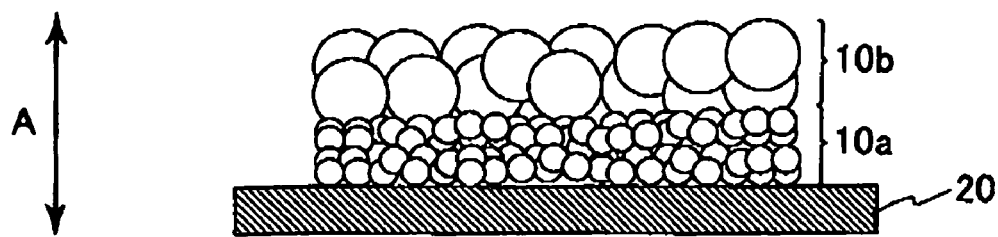
FIG. 3 is an enlarged view of a polarizable electrode in the electric double layer capacitor according to the embodiment of the present invention (No. 1).

As shown in FIG. 3, the polarizable electrode 10 includes two layers 10a and 10b, which are arranged in a thickness direction A, and which are made of activated carbon powder having mutually different average grain sizes. Here, the average grain size of the activated carbon powder in the layer 10b contacting the separator 4 is greater than the average grain size of the activated carbon powder in the layer 10a located on the positive electrode case 2 side, the positive electrode case 2 functions as the collector. That is, the grain sizes of the activated carbon powder in the portion of the electrode 10 subject to instillation of the electrolytic solution are increased.

Figure 4:
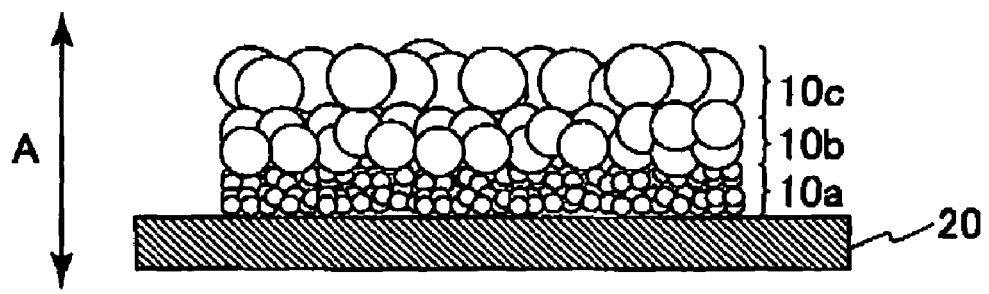
FIG. 4 is an enlarged view of another polarizable electrode in the electric double layer capacitor according to the embodiment of the present invention (No. 2).

Meanwhile, the polarizable electrode in this embodiment is not limited to have two layers. The polarizable electrode may include more than two layers. For example, as shown in FIG. 4, the polarizable electrode may include three layers 10a, 10b, and 10c, each of which is made of activated carbon powder having mutually different average grain sizes. In this case, it is preferable that the average grain size of the activated carbon powder in the layer 10c contacting the separator 4, which is subject to instillation of the electrolytic solution, be set greater than the average grain sizes of the activated carbon powder in the layers 10a and 10b, which are located on the collector side.

Figure 5:
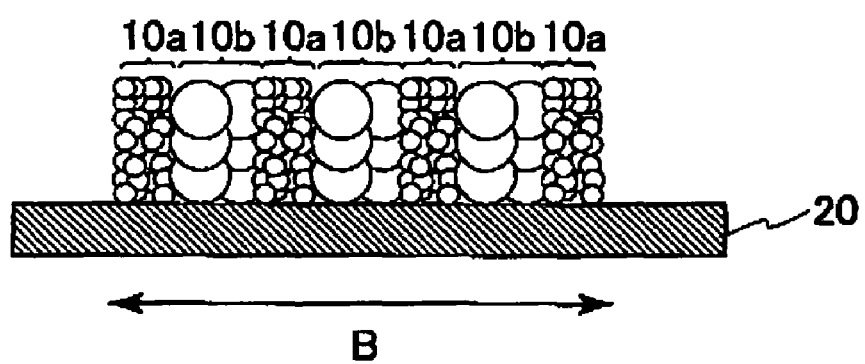
FIG. 5 is an enlarged view of still another polarizable electrode in the electric double layer capacitor according to the embodiment of the present invention (No. 3).
Figure 6:
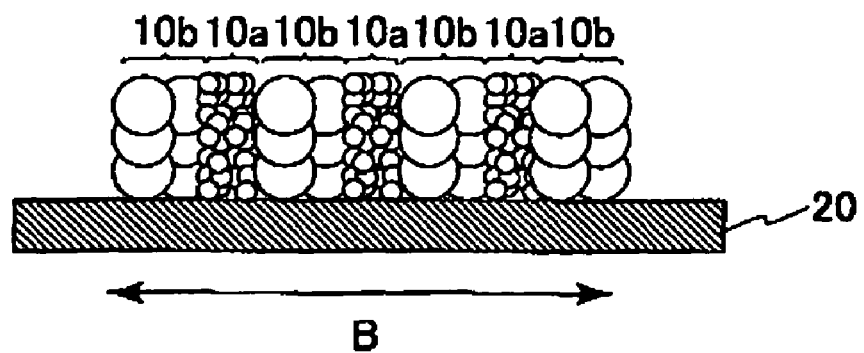
FIG. 6 is an enlarged view of yet another polarizable electrode in the electric double layer capacitor according to the embodiment of the present invention (No. 4).

Moreover, as shown in FIG. 5 and FIG. 6, the polarizable electrode of this embodiment may include the layers 10a and 10b arranged in a width direction B, which is a perpendicular direction to the thickness direction A. The layers 10a and 10b are made of activated carbon powder having mutually different average grain sizes. In this case, as shown in FIG. 6, it is more preferable to increase the average grain size of the activated carbon powder in the outermost layer 10b in order to improve instillation from side surfaces.

While the details of the polarizable electrode 10 have been described with reference to FIG. 3 to FIG. 6, it is also preferable that the polarizable electrode 11 has a configuration similar to that for the polarizable electrode 10.

(Operations and Effects)

As shown in FIG. 1, a single-layer electrode 10 having a single average grain size of the activated carbon powder is used for a conventional electric double layer capacitor.

Here, the inventors of the present invention have focused on applying the electrode including at least two layers made of activated carbon powder containing mutually different average grain sizes.

According to the embodiment of the present invention as shown in detail in FIG. 3 and FIG. 4, the electrode 10 including at least two layers 10a and 10b is used in each of the electrochemical devices. The two layers 10a and 10b are arranged in the thickness direction A, and made of the activated carbon powder containing mutually different average grain sizes. The average grain size of the activated carbon powder in the layer 10b contacting the separator 4 is set greater than the average grain size of the activated carbon powder in the layer 10a located on the collector side. In this way, the layer 10b in the electrode 10 located on the separator 4 side, i.e., the surface where the electrolytic solution is dropped mainly and impregnation of the electrolytic solution is performed mainly, has the activated carbon powder with the larger average grain size. Therefore, an impregnation property of the electrolytic solution is improved and it is possible to suppress the raise of the internal resistance after assembly.

Similarly, the electrode 10 including at least two layers 10a and 10b is used in each of the electrochemical devices of the embodiment of the present invention, as shown in detail in FIG. 5 and FIG. 6. The two layers 10a and 10b are arranged in the width direction B, and made of the activated carbon powder having mutually different average grain sizes. It is possible to provide the portion having the activated carbon powder with the larger average grain size, in the layer of the electrode 10 located on the separator 4 side, i.e., the surface where the electrolytic solution is dropped mainly and impregnation of the electrolytic solution is performed mainly. Accordingly, average spaces where the electrolytic solution contacts are increased on this surface, the impregnation property of the electrolytic solution is improved, and it is possible to suppress the raise of the internal resistance after assembly.

Moreover, according to the electrochemical device of the embodiment of the present invention, each of the electrodes includes at least two layers and the two layers have mutually different average grain size. That is, the electrochemical device has the activated carbon powder with the smaller average grain size. Accordingly, a bulk density of the activated carbon powder can be increased favorably on the entire electrodes, and a high discharge capacity can be maintained.

Furthermore, according to the electrochemical device of the embodiment of the present invention, the electrolytic solution is easily impregnated, even if a time period for impregnation is reduced upon assembly, and if the electrochemical device is assembled without performing a process such as vacuum impregnation. Therefore, operations at the time is of assembly can be simplified and the raise of the internal resistance after assembly can be suppressed without dispersion.

(Other Embodiments)

Although the present invention has been described with reference to the above embodiment, it is to be understood that the description and the drawings constituting parts of this disclosure shall not limit the scope of the invention. From the teachings of this disclosure, various alternative embodiments, examples, and application techniques are clear to those skilled in the art.

For example, the metallic coin-type cell has been described as the example of the electric double layer capacitor according to the embodiment. However, the present invention is also applicable, in a similar manner, to a cylindrical cell and to a chip cell made of resin or ceramics.

Moreover, the electric double layer capacitor has been described as the example of the electrochemical device of the embodiment. However, the present invention is not limited to this configuration, and is also applicable, in a similar manner, to a thin profile battery, such as a lithium battery and a polyacene battery, in which an electrolytic solution is used. Note that the material of such an electrochemical device is not particularly limited, and that the electrochemical device can be fabricated by use of various publicly-known materials.

It is therefore needless to say that the present invention includes various other embodiments which are not described herein. Accordingly, the technical scope of the present invention is to be determined with only matters to define the invention as recited in appropriate cams on the basis of the foregoing descriptions.

EXAMPLES

Hereinafter, the electric double layer capacitor according to the present invention will be described more specifically with reference to a certain example. Moreover, comparative examples are used herein to clarify the advantages of the electric double layer capacitor of the present invention employing the electrodes each of which includes at least two layers made of the activated carbon powder having mutually different average grain sizes. The advantages of the electric double layer capacitor of the present invention are, namely, that it is made possible improve a discharge capacity, to maintain a high impregnation property of an electrolytic solution into the electrodes, and to reduce the internal resistance after assembly. Note that the electric double layer capacitor according to the present invention shall not be limited to the following example, and that various modifications and alteration can be made as appropriate without departing from the spirit and scope of the present invention.

Example 1

In Example 1, the polarizable electrodes 10 and 11 are fabricated, and concurrently, the electrolytic solution is prepared to produce the electric double layer capacitor as shown in FIG. 2 and FIG. 3.

[Fabrication of Polarizable Electrodes]

Activated carbon powder having a specific surface of 2000 m²/g and an average grain size of 8 μm obtained by chemical activation is classified with a sieve having a mesh size of 20 μm to remove the grains having the sizes equal to or below 20 μm. In this way, activated carbon powder having an average grain size of 35 μm is obtained. Acetylene black in an amount of 5 parts by weight and polytetrafluoroethylene in an amount of 5 parts by weight are added to the activated carbon powder having the average grain size of 35 mun in an amount of 100 parts by weight, and the mixture is kneaded to fabricate a discoidal electrode sheet A in a thickness of 0.5 mm. A bulk density of this electrode sheet A is equal to 0.45 g/ml.

On the other hand, acetylene black in an amount of 5 parts by weight and polytetrafluoroethylene in an amount of 5 parts by weight are added to the activated carbon powder having the specific surface of 2000 m²/g and the average grain size of 8 μm obtained by chemical activation (which is not subjected to the classification process as described above) in an amount of 100 parts by weight, and the mixture is kneaded to fabricate a discoidal electrode sheet B in a thickness of 0.5 mm. A bulk density of this electrode sheet B is equal to 0.60 g/ml.

Next, the electrode sheet A is superposed on the electrode sheet B, and the electrode sheets are rolled and punched out to fabricate the polarizable electrodes 10 and 11 in a discoidal shape each having a diameter of 13 mm and a thickness of 0.5 mm. Here, the electrode sheet A corresponds to the layer 10a shown in FIG. 3, and the electrode sheet B corresponds to the layer 10b shown in FIG. 3.

[Preparation of Electrolytic Solution]

An electrolytic solution is prepared by dissolving tetraethylammonium tetrafluoroborate as a solute into a propylene carbonate as a solvent to achieve a concentration of 1 mol/l.

[Production of Electric Double Layer Capacitor Cell]

Conductive paste is applied to the center of an inner bottom surface of each of the positive electrode case 2 made of stainless steel SUS 316 and the negative electrode cap 3 made of stainless steel SUS 304. Then, the pair of polarizable electrodes 10 and 11 fabricated as described above are attached so as to locate the electrode sheet B (the layer 10b in FIG. 3) at the positive electrode case 2 side and to the negative electrode cap 3, respectively, and are dried in a vacuum at 180° C. for five hours. Thereafter, the electrolytic solution prepared as described above is dripped on the electrode sheet A (the layer 10a in FIG. 3) of the polarizable electrodes 10 and 11 for impregnation. Then, the glass fiber separator 4 is placed on the polarizable electrode 10, and the negative electrode cap 3 is immediately united with the positive electrode case 2 by means of the gasket 5 made of polyether ether ketone resin so as to locate the polarizable electrode 11 on the separator 4. Subsequently, an upper end of the positive electrode 2 is caulked inward to produce the electric double layer capacitor as shown in FIG. 2

Comparative Example 1

In the fabricating process of the electrodes as described in Example 1, an electric double layer capacitor cell is produced under similar conditions to Example 1 except that the electrodes are fabricated by use of the electrode sheet B only.

Comparative Example 2

In the fabricating process of the electrodes as described in Example 1, in electric double layer capacitor cell is produced under similar conditions to Example 1 except that the electrodes are fabricated by use of the electrode sheet A only.

Comparative Example 3

In the fabricating process of the electrodes as described in Example 1, an electric double layer capacitor cell is produced under similar conditions to Example 1 except that the electrodes are fabricated by use of an electrode sheet C fabricated under similar conditions while using activated carbon powder having an average grain size of 3 μm instead of the electrode sheet A.

A bulk density of this electrode sheet C is equal to 0.44 g/ml.

(Test 1)

Subsequently, the internal resistance of each of the electric double layer capacitor cells produced as described above in Example 1 and Comparative Examples 1 to 3, is measured immediately after assembly by use of a 1-kHz alternating-current resistance meter.

(Results)

Table 1 shows average values and standard deviations which represent results of measurements in Test 1.

TABLE 1

| | Internal resistance of cell | |
|---|---|---|
| | Average value (Ω) | Standard deviation |
| Example 1 | 10.5 | 0.50 |
| Comparative Example 1 | 13.5 | 2.88 |
| Comparative Example 2 | 10.6 | 0.32 |
| Comparative Example 3 | 18.4 | 2.44 |

As shown in Table 1, in Example 1 and Comparative Example 2, the activated carbon powder having the average grain size of 35 μm is used in the portions contacting the electrolytic solution. The results of Example 1 and Comparative Example 2 reveal smaller average values of the internal electric resistance and smaller standard deviations as compared to the cases in Comparative Example 1 and Comparative Example 3. Accordingly, it is confirmed that the internal electric resistance is reduced and variation becomes small by increasing the grain sizes of the activated carbon powder in the portions contacting the electrolytic solution. In addition, this tendency remains unchanged after a lapse of certain time since the assembly.

(Test 2)

Next, each of the electric double layer capacitors produced as described above is charged at a constant voltage of 2.5 V for one hour, and is then subjected to a discharge test down to 1.0 V at 1.0 mA. In this way, a discharge capacity in a first cycle is measured. Then, charging and discharging operations are repeated under the above conditions, and the discharge capacity in the cycle marking the maximum value is measured to calculate a proportion of the discharge capacity in the first cycle relative to the maximum discharge capacity.

(Results)

Table 2 shows results of Test 2.

TABLE 2

|  | Discharge capacity in first cycle (mAh) | Maximum discharge capacity (mAh) | Proportion of discharge capacity in first cycle relative to maximum discharge capacity (%) |
| --- | --- | --- | --- |
| Example 1 | 0.45 | 0.47 | 97 |
| Comparative Example 1 | 0.37 | 0.46 | 80 |
| Comparative Example 2 | 0.31 | 0.31 | 98 |
| Comparative Example 3 | 0.24 | 0.40 | 59 |

As shown in Table 2, in Example 1, the activated carbon powder having the grain size of 35 μm are used in the portions contacting the electrolytic solution, so as to serve as the two-layer structured electrodes with the activated carbon powder having the grain size of 8 μm. The results of Example 1 show substantially the same level of the discharge capacity in the first cycle as the maximum charge capacity, and the proportion of the two values is equal to 97%. It is confirmed, therefore, that the electrolytic solution is sufficiently impregnated into the electrodes immediately after assembly.

On the other hand, in Comparative Example 2, in which the electrodes made solely of the active carbon powder having the average grain size of 35 μm, are used, the results show substantially the same discharge capacity in the first cycle as the maximum discharge capacity. However, the maximum discharge capacity remains at a low level. This is attributed to the fact that the bulk density of the electrodes is low and the amount of the active material is small because of the large grain sizes of the activated carbon powder in spite of the fine impregnation property of the electrolytic solution from the point immediately after assembly.

Meanwhile, in Comparative Example 1, in which the electrodes made solely of the active carbon powder having the average grain size of 35 μm are used, the discharge capacity, which is almost equivalent to Example 1, is achieved. However, the proportion between the discharge capacity in the first cycle and the maximum discharge capacity is low. Thus, the poor impregnation property of the electrolytic solution is proven in this case.

Meanwhile, in Comparative Example 3, the activated carbon powder having the average grain size of 3 μm are used in the portions contacting the electrolytic solution, so as to serve as the two-layer structured electrodes is with the activated carbon powder having the average grain size of 8 μm. The results of Comparative Example 3 show the low maximum discharge capacity and the low proportion between the discharge capacity in the first cycle and the maximum discharge capacity. This is attributed to the fact that the electrolytic solution is not sufficiently impregnated into the electrodes even after undergoing the charging and discharging cycles due to the small average grain side at the portions contacting the electrolytic solution.

Here, in Example 1 the electrode includes two layers, which are arranged in the thickness direction A, and which are made of the activated carbon powder having mutually different average grain sizes, and the average grain size of the activated carbon powder in the layer contacting the electrolytic solution is set greater. A similar tendency is observed in the case of using the electrode having the layer structure arranged in the width direction B. In this case, the favorable effect becomes more significant as so the average grain size contained in electrode is larger and the contact area with the electrolytic solution is larger.

Although the metallic coin-type cell is used in this example, similar effects can be obtained also in the case of chip cells made of resin or ceramics.

What is claimed is:

1. An electrochemical device, comprising:
a pair of electrodes at least containing activated carbon powder;
a separator interposed between the pair of electrodes; and
an electrolytic solution impregnated into the pair of electrodes and the separator; wherein
the electrodes and the separator are stacked on a collector,
the electrodes respectively includes at least two layers arranged in a thickness direction, and the two layers are made of the activated carbon powder having mutually different average grain sizes, and
the average grain size of the activated carbon powder in the layer contacting the separator is greater than the average grain size of the activated carbon powder in the layer located on the collector side.

2. An electrochemical device, comprising:
a pair of electrodes at least containing activated carbon powder;
a separator interposed between the pair of electrodes; and
an electrolytic solution impregnated into the pair of electrodes and the separator; wherein
the electrodes and the separator are stacked on a collector,
the electrodes respectively includes at least two layers arranged in a width direction, and the two layers are made of the activated carbon powder having mutually different average grain sizes.

* * * * *